United States Patent Office 3,316,308
Patented Apr. 25, 1967

3,316,308
POLYMERIC ADDUCTS OF DIVINYL SULFONE WITH WATER AND PREPARATION THEREOF
Clark M. Welch, New Orleans, La., assignor to the United States of America as represented by the Secretary of Agriculture
No Drawing. Original application June 21, 1962, Ser. No. 204,300, now Patent No. 3,281,204, dated Oct. 25, 1966. Divided and this application Apr. 16, 1964, Ser. No. 366,678
6 Claims. (Cl. 260—607)

This application is a division of Serial No. 204,300, filed June 21, 1962, now U.S. Patent No. 3,281,204, granted Oct. 25, 1966.

A non-exclusive, irrevocable, royalty-free license in the invention herein described, throughout the world for all purposes of the United States Government, with the power to grant sublicenses for such purposes, is hereby granted to the Government of the United States of America.

This invention relates to a new method for crosslinking cellulose which utilizes highly reactive polymeric addition products of divinyl sulfone with water. When applied to cellulosic textiles in the presence of alkalies and heat, these polymeric adducts etherify hydroxyl groups of the cellulose molecules to form highly stable crosslinks. Fibers of the treated cellulose are found to be insoluble in cuprammonium hydroxide solution. Fabrics which have been suitably treated with the adducts of this invention exhibit durable wrinkle resistance in both the wet and dry states, along with increased resistance to shrinkage, stretching and other forms of mechanical deformation. Although divinyl sulfone itself is known to crosslink cellulose, the strongly lachrymatory properties of divinyl sulfone makes its usage for the finishing of textiles entirely impracticable. By contrast, the polymeric adducts of divinyl sulfone with water which are described herein are completely odorless.

The polymers formed from the reaction of divinyl sulfone with water in the presence of alkaline catalysts are of two general types. A water-insoluble type is readily formed at moderate temperatures which depend somewhat on the catalyst used, and appears to have the structure.

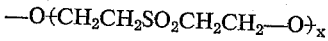

Its analysis, viscosity and water-insolubility indicate a fairly high molecular weight, and show that the water and divinyl sulfone have combined in a mole ratio of 1:1. In the presence of alkaline catalysts and heat, this product reacts with the hydroxyl groups of cellulose. It is believed that the polymer undergoes partial breakdown under such conditions to give materials of lower molecular weight. The resulting intermediates are believed to contain vinyl groups or 2-hydroxyethyl groups able to react with the hydroxyl groups of cellulose to form crosslinks of the type.

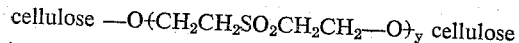

A second type of reactive polymer is distinguished by its high water-solubility. It is readily prepared by heating the insoluble type of polymer with water and an alkaline catalyst at a higher temperature than that used in forming the insoluble polymer. The soluble polymer appears to have the structure

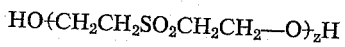

The analysis and high water-solubility of this product are indicative of a much lower molecular weight than that possessed by the insoluble type of polymer, and z appears to be in the range of 2–5. The soluble linear polymer is highly reactive toward cellulose in the presence of heat and alkalies. A by-product formed is the soluble cyclic adduct, 1,4-oxathietane-4,4-dioxide, which is unreactive toward cellulose. Although its presence in the treating solution is without effect, it may be removed by the addition of sodium chloride, which causes it to precipitate from aqueous solution. It may also be removed by repeated extraction with aromatic hydrocarbon solvents.

Catalysts which may be used in forming these polymers include alkali and alkaline earth metal hydroxides, alkali metal carbonates and quaternary ammonium carbonates or hydroxides, as well as other bases of comparable strength. When divinyl sulfone is warmed with dilute aqueous solutions of the above bases, it goes into solution, and shortly thereafter a new liquid organic phase separates, which contains the insoluble type of polymer. Reaction temperatures in the range of 40–55° C. are preferred when using hydroxides as catalysts, or 80–90° C. when using carbonates as catalysts. Catalyst concentrations of 0.2–5% by weight may be used. The dense organic layer may readily be freed of any odor of unreacted divinyl sulfone by water-extraction of the latter. The dried polymer is an odorless, colorless gum. If the insoluble polymer which forms in this process is not separated from the aqueous alkali, but is heated further, the organic material redissolves to give the soluble type of polymer. Reaction temperatures for this second step of 80–100° C. are preferred when using hydroxide catalysts, or 95–100° C. when using carbonates as catalysts.

The water-insoluble polymer may be applied to cellulosic textiles as its solution in inert organic solvents. The textile material is then freed of solvent by drying and is thoroughly wet with a dilute aqueous solution of an alkaline catalyst. Suitable catalysts include alkali and alkaline earth metal hydroxides, alkali metal carbonates and bicarbonates, as well as quaternary ammonium hydroxides, carbonates or bicarbonates, and other bases of comparable strength. The catalyst concentration may be varied within wide limits but concentrations of 0.5–5% are preferred. The textile material is then heat-cured at temperatures of 80–180° C., with temperatures of 110–150° C., giving the greatest strength retention. Curing times vary with the catalyst concentration and temperature used, but at the preferred temperatures 1–10 minutes suffices. The cellulosic textile material is then washed free of catalyst.

The water-soluble polymer may be applied to cellulosic textiles directly from aqueous solution, using the same catalysts and curing conditions as with the insoluble type of polymer.

In the following examples, crease recovery angles cited are double the values measured in the warp direction by the Monsanto crease recovery test. The adaptation of Lawrence and Phillips, Am. Dyestuff Reptr., 45 548 (1956)) was used for crease recovery tests in the wet state. A Scott tester was used for breaking strength determinations, which were made in the warp direction and corrected to a standard thread count. Parts and percentages specified are by weight where otherwise indicated.

*Example 1*

The water-insoluble type of polymeric adduct was prepared as follows: to 0.2 part of sodium hydroxide in 50 parts of water was added 10 parts by volume of divinyl sulfone. The mixture was warmed with stirring to 40° C., and the heat source was removed. A moderately exothermic reaction occurred, causing the temperature to rise to 50° C. The sulfone went completely into solution and then a new liquid phase separated. After 10 minutes from the start of the reaction the temperature began to drop. After 20 minutes the aqueous phase was decanted, and the lower organic layer was stirred vigorously with 40 arts of water. The water extraction was repeated four times. The polymer was then dried at 110° C. for 15 minutes, giving 6.0 parts of a gum which hardened when cooled to room temperature. It contained 23.3% sulfur. The theoretical sulfur content for a polymer of the formula $(C_4H_6SO_2 \cdot H_2O)_x$ is 23.6%.

*Example 2*

A 10% solution in N,N-dimethylformamide of the polymer prepared in Example 1 was applied in one dip and one nip to desized, scoured and bleached 80 x 80 cotton print cloth, the wringer being set to give a wet pickup of 115%. The fabric was dried at 135° C. for 3 minutes, and treated in one dip and one nip with a 2% solution of sodium hydroxide in water to give an overall wet pickup of 102%. The fabric was cured at 135° C. for 5 minutes. It was thoroughly washed in both cold and hot water, dried and air-equilibrated. The treated fabric showed a weight gain of 4.6% and contained 1.96% sulfur. Its crease recovery angle was 274° (wet) and 250° (dry), whereas untreated fabric gave values of 160° and 165° respectively. The breaking strength loss was 54%.

*Example 3*

An aqueous solution of water-soluble polymeric adduct was made as follows: to 0.2 part of sodium hydroxide in 40 parts of water was added 10 parts by volume of divinyl sulfone. The stirred mixture was warmed to 40° C., after which heating was stopped. The temperature rose gradually to 50° C. due to a moderately exothermic reaction which took place. The divinyl sulfone went into solution and liquid polymer subsequently separated. After the mixture had been at 55° for 5 minutes, it was warmed to 85° C., causing the two phases to merge. After 15 minutes at 85° C., the solution was cooled to room temperature. It remained homogeneous. It was shaken with 40 parts by volume of benzene. After a second extraction with benzene, the aqueous phase was free of the odor of divinyl sulfone. The solute content was about 25%.

*Example 4*

The solution prepared in Example 3 was diluted with an equal volume of water, and to 24 parts by volume of the resulting solution was added 0.4 part of sodium hydroxide. The mixture was applied in one dip and one nip to 80 x 80 desized, scoured and bleached cotton print cloth to a wet pickup of 120%. The fabric was cured at 135° C. for 5 minutes. It was then washed, dried and air-equilibrated.

The fabric showed a weight gain of 5.2% and contained 1.33% sulfur. Its crease recovery angle was 285° (wet) and 241° ((dry) whereas untreated fabric gave values of 160° and 165° respectively. The breaking strength loss was 47%.

*Example 5*

An aqueous solution of water-soluble polymeric adduct was prepared as follows: to 1 part of sodium carbonate monohydrate in 39 parts of water was added 10 parts by volume of divinyl sulfone. The mixture was heated with stirring to 65° whereupon the sulfone dissolved. The temperature was raised to 90° whereupon a liquid organic phase separated. The temperature of the stirred mixture was raised to 100°, causing the two phases to merge. The solution was kept at 100° C. for 20 minutes and then cooled to room temperature. It remained homogeneous. It was shaken with 20 parts by volume of benzene and the lower aqueous phase was separated. To the organic phases was added 20 parts by volume of benzene and 30 parts of water, following which the mixture was shaken. The aqueous phase was separated and combined with the aqueous phase from the first extraction, giving 63 parts by volume of a clear, nearly odorless solution having a solute content of about 15%.

*Example 6*

The solution prepared in Example 5 was applied in one dip and one nip to desized, scoured and bleached 80 x 80 cotton print cloth to a wet pickup of 119%. The fabric was cured at 135° C. for 5 minutes. It was then washed, dried and air-equilibrated.

The fabric showed a weight gain of 8.6% and contained 1.63% sulfur. It had a crease recovery angle of 295° (wet) and 257° (dry), as compared with values of 160° and 165° respectively, for untreated fabric. The breaking strength loss was 54%.

*Example 7*

The procedure of Example 6 was repeated except that the treating solution was diluted with an equal volume of water, and to 100 parts of the diluted solution was added one part of sodium carbonate monohydrate. The fabric showed a weight gain of 4.0%, and gave crease recovery angles of 261° (wet) and 259° (dry). The breaking strength loss was 43%.

*Example 8*

The procedure of Example 3 was repeated except that the solution of water-soluble adduct was kept at 85° for only 10 minutes in the final heating step. The solution was neutralized with 0.3 ml. of glacial acetic acid, and was extracted with benzene in the way already described. The aqueous phase was evaporated until its boiling temperature reached 150° C. The viscous syrupy residue was dissolved in a large volume of acetone and filtered free of sodium acetate. The filtrate was evaporated until the boiling temperature reached 150° C. The syrup was extracted repeatedly with boiling benzene until no further crystalline cyclic adduct was obtained on evaporation of the benzene. There remained 7.4 parts of viscous benzene-insoluble syrup whose sulfur content was 21.7%. Monomeric bis(2-hydroxyethyl) sulfone was not the major constituent of the product, as shown by the fact that the polymer dissolved added crystals of the monomer, and failed to undergo crystallization at temperatures of −30° to +30° C.

*Example 9*

A water solution containing 12% of polymer prepared as in Example 8 and 3.2% sodium bicarbonate was applied in one dip and one nip to desized, scoured and bleached 80 x 80 cotton print cloth to a wet pickup of 78%. It was cured at 135° for 5 minutes, washed, dried and air-equilibrated.

The fabric showed a gain in weight of 4.7%, and a crease recovery angle of 259° (wet) and 222° (dry). Untreated fabric had a crease recovery angle of 155° (wet) and 145° (dry). The breaking strength loss was only 20%.

I claim:

1. A water-insoluble polymeric addition product of divinyl sulfone and water wherein the divinyl sulfone and the water are combined in a mole ratio of 1:1, said product being a dry, colorless, odorless gum entirely free from uncombined divinyl sulfone and characterized in that it has a sulfur content of about 23.3%.

2. A water-soluble polymeric addition product of divinyl sulfone and water represented by the structure $HO(CH_2CH_2SO_2CH_2CH_2O)_zH$ wherein $z$ is an integer of from 2 to 5, said product being entirely free from uncombined divinyl sulfone.

3. A process for preparing the water-insoluble polymeric addition product of claim 1 consisting essentially of reacting divinyl sulfone with an excess of water at a temperature of from 40 to 80° C. in the presence of from 0.2 to 5.0% by weight of an alkaline catalyst selected from the group consisting of alkali metal hydroxides, alkali metal carbonates, alkaline earth metal hydroxides, quaternary ammonium hydroxides and quaternary ammonium carbonates, thereby producing said water-insoluble polymeric addition product, and water-extracting said product to free it from uncombined divinyl sulfone.

4. The process of claim 3 wherein the alkaline catalyst is an alkali metal hydroxide.

5. The process of claim 3 wherein the alkaline catalyst is an alkali metal carbonate.

6. A process for preparing a water-soluble polymeric addition product of divinyl sulfone and water consisting essentially of reacting divinyl sulfone with an excess of water at a temperature of from 40 to 80° C. in the presence of from 0.2 to 5% by weight of an alkaline catalyst selected from the group consisting of alkali metal hydroxides, alkali metal carbonates, alkaline earth metal hydroxides, quaternary ammonium hydroxides and quaternary ammonium carbonates until a water-insoluble polymeric addition product of divinyl sulfone and water formed, continuing the heating at a temperature of from 80 to 100° C. until the said water-insoluble polymeric addition product is converted into a water-soluble polymeric addition product which dissolves in the aqueous reaction mixture, and benzene-extracting the water-soluble polymeric addition product to free it from uncombined divinyl sulfone.

References Cited by the Applicant

Tesoro et al.—Textile Research Journal, April 1961 pp 283–4.

CHARLES B. PARKER, *Primary Examiner.*

DELBERT R. PHILLIPS, *Assistant Examiner.*